United States Patent
Liu (10) Patent No.: US 12,432,634 B2
(45) Date of Patent: Sep. 30, 2025

(54) SIGNAL MEASUREMENT METHOD AND APPARATUS, AND COMMUNICATION DEVICE AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 689 days.

(21) Appl. No.: 17/786,480

(22) PCT Filed: Dec. 20, 2019

(86) PCT No.: PCT/CN2019/127133
§ 371 (c)(1),
(2) Date: Jun. 16, 2022

(87) PCT Pub. No.: WO2021/120204
PCT Pub. Date: Jun. 24, 2021

(65) Prior Publication Data
US 2023/0012097 A1    Jan. 12, 2023

(51) Int. Cl.
*H04W 36/00*    (2009.01)
*H04W 4/70*    (2018.01)
*H04W 36/14*    (2009.01)
*H04W 36/24*    (2009.01)

(52) U.S. Cl.
CPC .......... *H04W 36/037* (2023.05); *H04W 4/70* (2018.02); *H04W 36/0058* (2018.08); *H04W 36/0072* (2013.01); *H04W 36/24* (2013.01); *H04W 36/1446* (2023.05)

(58) Field of Classification Search
None
See application file for complete search history.

(56) References Cited

U.S. PATENT DOCUMENTS

| | | | |
|---|---|---|---|
| 9,730,006 | B1 | 8/2017 | Krishnamoorthy et al. |
| 9,730,127 | B2 | 8/2017 | Cho |
| 2013/0079010 | A1 | 3/2013 | Brisebois et al. |
| 2016/0050590 | A1 | 2/2016 | Ponukumati et al. |
| 2018/0139682 | A1* | 5/2018 | Xu .......... H04W 40/22 |
| 2018/0213379 | A1* | 7/2018 | Xiong ..... H04W 4/70 |
| 2019/0320361 | A1* | 10/2019 | Uchiyama ........... H04W 36/033 |

(Continued)

FOREIGN PATENT DOCUMENTS

| | | |
|---|---|---|
| CN | 109076626 A | 12/2018 |
| CN | 110475335 A | 11/2019 |
| WO | 2017113264 A1 | 7/2017 |

OTHER PUBLICATIONS

International Search Report of PCT/CN2019/127133 dated Sep. 24, 2020 with English translation, (4p).

(Continued)

*Primary Examiner* — Jutai Kao
(74) *Attorney, Agent, or Firm* — Arch & Lake LLP (57) ABSTRACT

A signal measurement method and apparatus, and a communication device and a storage medium are provided. The method includes that a first communication device receives, via a first type of network, a measurement result, sent by a second communication device, for a second type of network.

14 Claims, 7 Drawing Sheets

(56) References Cited

U.S. PATENT DOCUMENTS

2020/0169924 A1* 5/2020 Lobinger .......... H04W 36/0061

OTHER PUBLICATIONS

First Office Action issued to Chinese Application No. 201980003684.1 dated Jun. 30, 2021 with English translation, (15p).
Liru, Pi, et al., "Analysis of Mobility Problems in LTE Heterogeneous Network Deployment", Publisher: China Communications dated Apr. 5, 2013, (3p).
Qualcomm Incorporated, "UE Power Consumption Reduction in RRM Measurements", 3GPP TSG-RAN WG1 Meeting #94bis, R1-1811284, Chengdu, China, Oct. 8-12, 2018, (8p).

* cited by examiner

SIGNAL MEASUREMENT METHOD AND APPARATUS, AND COMMUNICATION DEVICE AND STORAGE MEDIUM

CROSS-REFERENCE TO RELATED APPLICATION

The present application is the U.S. National phase application of International Application No. PCT/CN2019/127133, filed on Dec. 20, 2019, the entire content of which is incorporated herein by reference for all purposes.

TECHNICAL FIELD

The present application relates to the field of wireless communication technology but is not limited to the field of wireless communication technology, and in particular to signal measurement methods and apparatuses, a communication device, and a storage medium.

BACKGROUND

At present, wearable devices, such as watches, have been implemented to communicate using cellular mobile communication technology.

Once the wearable device is connected to a cellular mobile communication network, a base station sends a measurement configuration to instruct the wearable device to carry out a wireless signal measurement, and the wearable device may determine whether to perform cell handover based on measurement results.

SUMMARY

In view of above, embodiments of the present disclosure provide signal measurement methods and apparatuses, a communication device, and a storage medium.

According to a first aspect of the present disclosure, there is provided a signal measurement method applied to a first communication device. The method includes receiving, via a first type of network, a measurement result for a second type of network from a second communication device.

According to a second aspect of the present disclosure, there is provided a signal measurement method applied to a second communication device. The method includes performing a wireless signal measurement for a second type of network and sending, via a first type of network, a measurement result obtained by performing the wireless signal measurement to a first communication device.

According to a third aspect of the present disclosure, there is provided a communication device including a processor, a transceiver, a memory, and an executable program stored in the memory that can be run by the processor. The processor performs the steps of the signal measurement method as described in the first aspect or the second aspect when running the executable program.

According to a fourth aspect of the present disclosure, there is provided a non-transitory storage medium on which an executable program is stored. The executable program when executed by a processor implements the steps of the signal measurement method as described in the first aspect or the second aspect.

It should be understood that the foregoing general description and the following detailed description are exemplary and explanatory only and do not limit the embodiments of the present disclosure.

BRIEF DESCRIPTION OF THE DRAWINGS

The accompanying drawings herein are incorporated into and form part of this specification, illustrate principles consistent with embodiments of this disclosure, and are used in conjunction with the specification to explain the embodiments of this disclosure.

DETAILED DESCRIPTION

Embodiments will be described herein in detail, examples of which are shown in the accompanying drawings. When the following description relates to the drawings, unless otherwise indicated, the same numerals in the different drawings indicate the same or similar elements. The implementations described in the following embodiments do not represent all implementations that are consistent with the present disclosure. Rather, they are only examples of devices and methods that are consistent with some aspects of embodiments of the present disclosure as detailed in the appended claims.

The terms used in the embodiments of the present disclosure is intended solely for the purpose of describing particular embodiments and is not intended to limit embodiments of the present disclosure. The singular forms of "a", "said" and "the" as used in the embodiments of the present disclosure and the appended claims are also intended to include plural forms, unless the context clearly indicates other meanings. It should also be understood that the term "and/or" as used herein refers to include any and all possible combinations of one or more of the associated listed items.

It should be understood that although the terms "first", "second", "third", etc. may be employed in embodiments of the present disclosure to describe various types of information, such information should not be limited by these terms. These terms are used only to distinguish the same type of information from one another. For example, without departing from the scope of embodiments of the present disclosure, first information may also be referred to as second information, and similarly, second information may also be referred to as first information. The word "if" as used herein may be interpreted as "in the time of" or "when" or "in response to a determination", which depends on the context.

Figure 1:
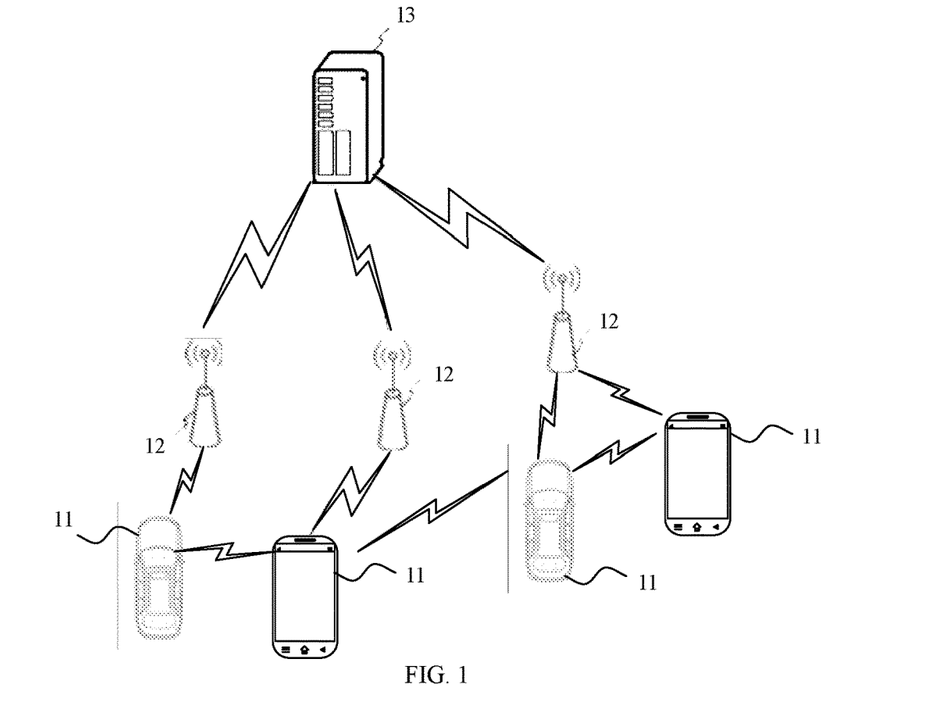
FIG. 1 is a structural schematic diagram of a wireless communication system illustrated in accordance with an embodiment.

Referring to FIG. 1, which illustrates a structural schematic diagram of a wireless communication system provided by embodiments of the present disclosure. As shown in FIG. 1, the wireless communication system is a communication system based on cellular mobile communication technology and may include a plurality of terminals 11 and a plurality of base stations 12.

The terminal 11 may be a device that provides voice and/or data connectivity to a user. The terminal 11 may communicate with one or more core networks via a Radio Access Network (RAN), and the terminal 11 may be an IoT terminal, such as a sensor device, a cell phone (or "cellular" phone), and a computer with an IoT terminal, e.g., stationary, portable, pocket-sized, handheld, computer-built, or vehicle-mounted devices. For example, the terminal 11 may be a station (STA), subscriber unit, subscriber station, mobile station, mobile, remote station, access node, remote terminal, access terminal. terminal), access terminal, user terminal, user agent, user device, or user equipment (UE). Alternatively, the terminal 11 may be a device of an unmanned aerial vehicle. Alternatively, the terminal 11 may be an in-vehicle device, for example, a trip computer with wireless communication function, or a wireless communication device external to the trip computer. Alternatively, the terminal 11 can also be an infrastructure, e.g., a street light, a signal light, or other infrastructure with wireless communication function.

The base station 12 may be a network side device in a wireless communication system. The wireless communication system may be the 4th generation mobile communication (4G) system, also known as a Long Term Evolution (LTE) system, or the wireless communication system may be a 5G system, also known as a new radio (NR) system or 5G NR system. Alternatively, the wireless communication system may also be a further next generation system of the 5G system, where the access network in the 5G system can be called New Generation-Radio Access Network (NG-RAN). Alternatively, the wireless communication system may be a MTC system.

In this case, the base station 12 can be an evolved base station (eNB) employed in a 4G system. Alternatively, the base station 12 can be a base station (gNB) with a centralized distributed architecture employed in a 5G system. When the base station 12 adopts a centralized distributed architecture, it usually includes a central unit (CU) and at least two distributed units (DUs). The centralized unit is provided with the protocol stack of Packet Data Convergence Protocol (PDCP) layer, Radio Link Control (RLC) layer, and Media Access Control (MAC) layer. The distributed unit is provided with the protocol stack of the physical (PHY) layer. The specific implementation of the base station 12 is not limited by this disclosure.

A wireless connection may be established between the base station 12 and the terminal 11 via a wireless air interface. In various implementations, the wireless interface is based on the fourth-generation mobile cellular communication network technology (4G) standard, or the wireless interface is based on the fifth-generation mobile cellular communication network technology (5G) standard, for example, the wireless interface is new radio, or the wireless interface may be based on the next generation mobile cellular communication network technology standard of 5G.

In some embodiments, End to End (E2E) connections may be established between terminals 11, such as, vehicle to vehicle (V2V) communication, vehicle to infrastructure (V2I) communication and vehicle to pedestrian (V2P) communication in vehicle to everything (V2X) communication scenarios.

In some embodiments, the above wireless communication system may also include a network management device 13.

Serval base stations 12 are respectively connected to the network management device 13. The network management device 13 may be a core network device in a wireless communication system, e.g., a Mobility Management Entity (MME) in an Evolved Packet Core (EPC) network. Alternatively, the network management device may be another core network device, such as a Serving GateWay (SGW), Public Data Network GateWay (PGW), Policy and Charging Rules Function (PCRF), or Home Subscriber Server (HSS), etc. The specific implementation of the network management device 13 is not limited by the embodiments of this disclosure.

The execution subjects involved in the embodiments of the present disclosure include, but are not limited to: user equipment such as wearable devices, terminals of mobile cellular communication networks, and base stations, etc.

The application scenarios of the embodiments of the present disclosure include, but are not limited to, scenarios where a user typically carries both a wearable device such as a smart watch, a sports bracelet and a smart clothing, and a mobile phone, in which the wearable device and the mobile phone are typically connected using Bluetooth communication. The wearable device and the mobile phone are always in the same location in a cell in terms of the base station. However, the base station needs to send the measurement configuration to the wearable device and the mobile phone separately when performing signal measurement, and if there are multiple wearable devices connected to the user's mobile phone, the base station needs to send the measurement configuration to the mobile phone and multiple wearable devices separately. Further, the mobile phone and multiple wearable devices in the same location need to perform measurements for wireless signal separately, but the results obtained from the measurements will be very close to each other without substantial differences, which is wasteful from the perspective of power consumption and wireless resources.

Figure 2:
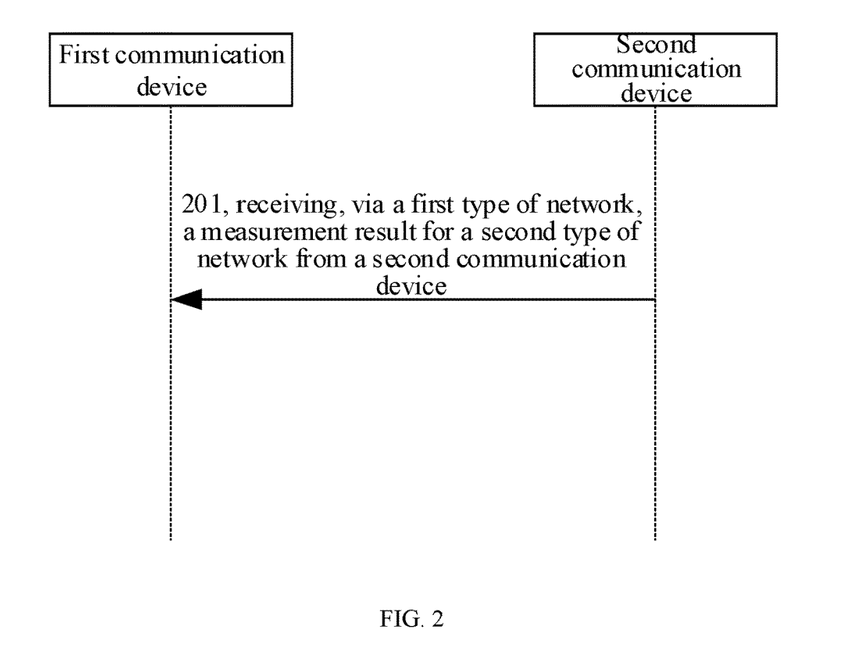
FIG. 2 is a flow diagram of a signal measurement method illustrated in accordance with an embodiment.

As shown in FIG. 2, there is provided a signal measurement method by an exemplary embodiment. The signal measurement method may be applied to a first communication device. The signal measurement method includes the following steps.

Step 201, receiving, via a first type of network, a measurement result for a second type of network from a second communication device.

The first communication device may be a communication device having a smaller battery capacity or less power remaining. The second communication device may be a communication device having a larger battery capacity or more power remaining.

For example, the first communication device may be a wearable device such as a smart watch, a sports bracelet, etc., or a mobile phone with less power remaining, etc. The second communication device may be a mobile phone with more power, etc.

The first type of network and the second type of network may be networks with different communication protocols, communication bands, and/or power ranges. The first type of network may be a wireless communication network with a smaller coverage area, and the transmission power of the wireless signal in the first type of network is smaller. The second type of network may be a wireless communication network with a larger coverage area, and the transmission power of the wireless signal in the second type of network is higher.

For example, the second type of network may be a cellular mobile communication network such as 4G or 5G. The first type of network may be a short-range communication network such as Blue Tooth (BT), low-power Blue Tooth, or Wi-Fi.

The first communication device and the second communication device may both have the ability to access the first type of network and the second type of network. The first communication device and the second communication device may access the second type of network at the same time, and the first communication device and the second communication device are connected to each other via the first type of network. For example, the smart watch and the mobile phone may access a 4G or 5G cellular mobile communication network, and the smart watch and the mobile phone are connected to each other via low-power Blue Tooth.

The base station etc. of the second type of network may send a measurement configuration to instruct the first communication device to perform a wireless signal measurement. Since the battery power of the first communication device such as a smart watch, a bracelet and other wearable devices is small, frequent wireless signal measurements may consume battery current and reduce standby time. Therefore, the first communication device, after receiving the measurement configuration, may not perform the wireless signal measurement, but may instruct the second communication device to perform the wireless signal measurement by sending a command, etc. Since the first communication device and the second communication device are close to each other, the measurement results obtained from the wireless signal measurements performed by the first communication device and the second communication device are relatively close. The measurement result obtained by the second communication device can be used as a basis for the first communication device to perform operations such as cell reselection. Therefore, after completing the wireless signal measurement, the second communication may send the measurement result, etc., to the first communication device via the first class network. The power consumption of the first type of network between the first communication device and the second communication device is lower than the power consumption of the first communication device to perform the wireless signal measurement for the second type of network. Therefore, the power consumption of the first communication caused by performing the wireless signal measurement the first communication device may be reduced.

For example, the first communication device is a smart watch, the second communication device is a mobile phone, the first type of network is a Blue Tooth network, and the second type of network is a 5G cellular mobile communication network. A base station of the 5G cellular mobile communication network sends a measurement configuration to the smart watch to instruct the smart watch to perform a wireless signal measurement for the 5G cellular mobile communication network. After receiving the measurement configuration, the smart watch may instruct the mobile phone to perform a wireless signal measurement via a Blue Tooth connection, etc. After the mobile phone completes the wireless signal measurement, the mobile phone may send the measurement result, etc. to the smart watch via Blue Tooth, etc. The mobile phone may perform additional wireless signal measurements based on the measurement configuration sent by the smart watch. The mobile phone may also combine the wireless signal measurement instructed by the smart watch with its own wireless signal measurement, so that the power consumption of the mobile phone can be saved.

Due to the close distance between the smart watch and the mobile phone, the measurement results obtained from the wireless signal measurements by the smart watch and the mobile phone are relatively close. The measurement result obtained by the mobile phone can be used as the basis for operations such as cell reselection by the smart watch. In this case, the power consumption of the Blue Tooth connection between the smart watch and the cell phone is lower than the power consumption of the wireless signal measurement performed by the smart watch for the cellular mobile communication network. Therefore, the power consumption of the smart watch caused by performing the wireless signal measurement may be reduced.

In this way, the wireless signal measurement is performed by the second communication device and the measurement result are sent to the first communication device, which reduces the power consumption of the first communication device caused by performing the wireless signal measurement, and thus extends the standby time of the first communication device.

Figure 3:
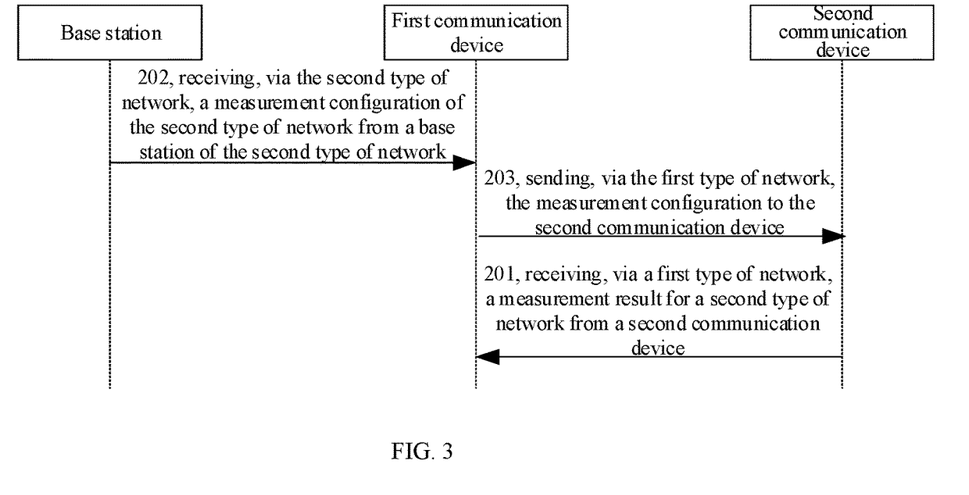
FIG. 3 is a flow diagram of another signal measurement method illustrated in accordance with an embodiment.

In one embodiment, as shown in FIG. 3, prior to step 201, the signal measurement method further includes the following steps.

Step 202, receiving, via the second type of network, a measurement configuration of the second type of network from a base station of the second type of network.

Step 203, sending, via the first type of network, the measurement configuration to the second communication device.

Step 201 may include: receiving, via the first type of network, the measurement result that is obtained by a wireless signal measurement performed by the second communication device for the second type of network based on the measurement configuration.

The base station of the second type of network may send the measurement configuration to instruct the first communication device to perform a wireless signal measurement. Since the battery power of the first communication device such as a smart watch, a bracelet and other wearable devices is small, frequent wireless signal measurements may consume battery current and reduce standby time. Therefore, instead of performing the wireless signal measurement after receiving the measurement configuration, the first communication device may send the measurement configuration to the second communication device via the first type of network, and then the second communication device performs the wireless signal measurement. Since the first communication device and the second communication device are close to each other, the measurement results obtained from the wireless signal measurements performed by the first communication device and the second communication device are relatively close. The measurement result obtained by the second communication device can be used as a basis for the first communication device to perform operations such as cell reselection. Therefore, after completing the wireless signal measurement, the second communication device may send the measurement result, etc., to the first communication device. The measurement result may be sent by the second communication to the first communication device via the first type of network.

For example, the second communication device is a mobile phone, the first communication device is a smart watch, the second type of network is a 5G cellular mobile communication network, and the first type of network is a Blue Tooth network or Wi-Fi, etc. A base station of the 5G cellular mobile communication network sends a measurement configuration to the smart watch to instruct the smart watch to perform a wireless signal measurement for the 5G cellular mobile communication network. After receiving the measurement configuration, the smart watch may send the measurement configuration to the mobile phone via a Blue Tooth connection, and then the mobile phone performs the wireless signal measurement for the second type of network according to the measurement configuration. After completing the wireless signal measurement, the mobile phone may send the measurement result, etc. to the smart watch. In this case, after the mobile phone receives the measurement configuration from the smart watch, the mobile phone performs the wireless signal measurement and sends the measurement result to the smart watch via a Blue Tooth connection so that performing the wireless signal measurement by the second communication device can reduce the power consumption of the first communication device and extend the standby time of the first communication device.

In one embodiment, the signal measurement method further includes: performing, in response to the measurement result meeting a cell reselection condition, a cell reselection.

The first communication device may perform cell reselection based on the measurement result sent by the second communication device. The measurement result may include strength of wireless signal, signal-to-noise ratio of wireless signal, etc.

For example, in a cellular mobile communication network, the smart watch may perform calculation of cell reselection judgment parameters based on the measurement result sent by the mobile phone via a Blue Tooth connection, e.g., calculating parameter C1 and/or parameter C2, etc. based on the measurement result. And then, the smart watch determines whether to perform cell reselection based on the cell reselection judgment parameters. The parameter C1 is used to characterize the path loss, which can be obtained by calculating the average signal level, the minimum received level, etc. from the measurement result. The parameter C2 is used to characterize the cell reselection evaluation value, which can be calculated based on the parameter C1 in combination with the cell reselection offset, etc.

In one embodiment, the signal measurement method further includes: sending a measurement report including the measurement result to the base station of the second type of network.

The first communication device may send the measurement report in different ways. For example, the first communication device may send the measurement report periodically or may send the measurement report by event triggering. In particular, the sending of the measurement report by event triggering may be triggered to send the measurement report to the base station when the signal quality parameter such as signal strength in the measurement result is lower than a preset value.

The base station of the second type of network may receive the measurement report sent by the first communication device, and determine whether to perform cell handover, etc., based on the measurement report.

In one embodiment, the signal measurement method may further include: receiving, via the first type of network, a reselection instruction from the second communication device, and performing a cell reselection according to the reselection instruction.

The reselection instruction may be determined by the second communication device based on the measurement result.

After the second communication device performs the wireless signal measurement to obtain the measurement result, the second communication device may determine whether the first communication device will perform a cell reselection based on the measurement result. The condition for the second communication device to determine whether the first communication device will perform a cell reselection may be the same as the condition for the first communication device itself to determine whether it will performs a cell reselection.

If the second communication device determines that the first communication device needs to perform a cell reselection, the second communication device may send a reselection instruction to the first communication device via the first type of network, which instructs the first communication device to perform the cell reselection. The cell reselection instruction may include information of a reselected cell. The first communication device may perform the cell reselection according to the reselection instruction.

In one embodiment, the signal measurement method may further include: sending, via the first type of network, a measurement indication to the second communication device. The measurement indication instructs the second communication device to send the measurement result for the second type of network to the first communication device via the first type of network.

After a connection is established between the first communication device and the second communication via the first type of network, the first communication device may send a measurement indication via the first type of network. The measurement indication may be a configuration configuring the second communication device to receive an indication from the first communication device to perform a wireless signal measurement for the second type of network and send a measurement result to the first communication device via the first type of network.

After the second communication device receives the measurement indication, the second communication device performs the wireless signal measurement according to the first communication device's indication and sends the measurement result to the first communication device after each completed wireless signal measurement.

In one embodiment, the signal measurement method may further include: obtaining a measurement result of a wireless signal measurement performed by the first communication device for the second type of network.

The first communication device may obtain the measurement result of the wireless signal measurement from the second communication device, or the first communication device itself may perform the wireless signal measurement for the second type of network.

The first communication device may predetermine measurement rules for wireless signals, and then the first communication device and the second communication device respectively perform the wireless signal measurement for the second type of network. For example, the first communication device may assign multiple wireless signal measurements within a predetermined time period to the first communication device and the second communication device.

For example, if the first communication device needs to obtain results of 10 measurements per minute, 2 wireless signal measurements may be carried out by the first communication device, and the remaining 8 wireless signal measurements may be carried out by the second communication device. In this way, the load of the first communication device can be reduced, battery power can be saved, and standby time can be extended, compared to all wireless signal measurements being performed by the first communication device.

In one embodiment, step 201 may include: receiving, in response to a signal strength of the first type of network being greater than a signal strength threshold, the measurement result for the second type of network via the first type of network from the second communication device.

The signal strength of the first type of network may be the signal strength of the wireless signals received by the first communication device from the second communication device. Although the first communication device and the second communication device are connected via the first type of network, the first communication device and the second communication device may not belong to the same second type of network. Therefore, the distance between the first communication device and the second communication device may be identified by determining the signal strength of the first class network. When the first communication device and the second communication device are relatively close to each other, it can be determined that there is a high probability that the first communication device and the second communication device belong to the same second type of network, and in this case, the wireless signal measurement can be performed by the second communication device for the second type of network.

For example, the smart watch is connected to the mobile phone via low-power Blue Tooth, and the smart watch may detect the signal strength of the Blue Tooth signal sent by the mobile phone. When the signal strength of the Blue Tooth signal is greater than a signal strength threshold, it is considered that the smart watch and the mobile phone are relatively close to each other and there is a high probability that the smart watch and the mobile phone are in the same mobile communication network cell, and the wireless signal measurement can be performed by the mobile phone.

Figure 4:
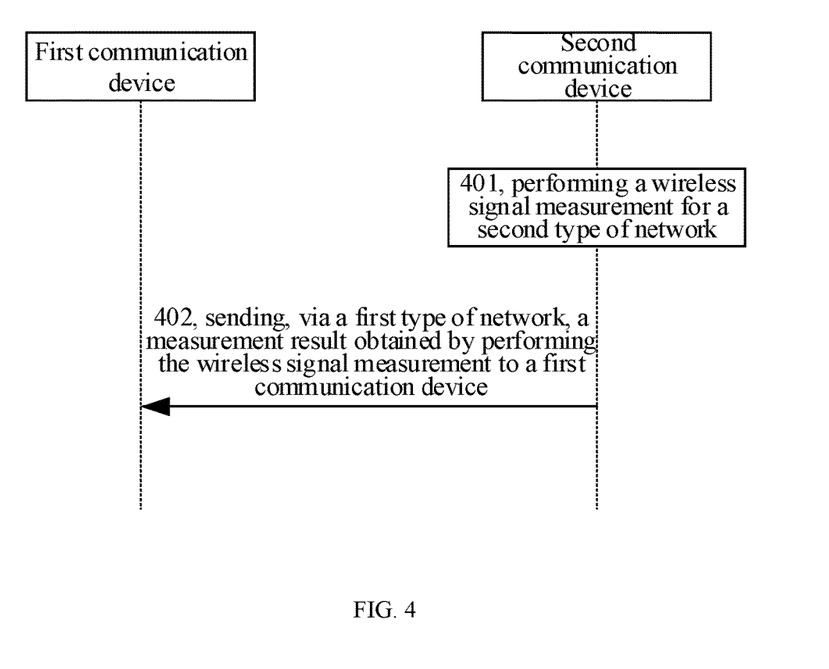
FIG. 4 is a flow diagram of yet another signal measurement method illustrated in accordance with an embodiment.

As shown in FIG. 4, there is provided a signal measurement method according to an exemplary embodiment. The signal measurement method may be applied to a second communication device, including the following steps.

Step 401, performing a wireless signal measurement for a second type of network.

Step 402, sending, via a first type of network, a measurement result obtained by performing the wireless signal measurement to a first communication device.

The first communication device may be a communication device having a smaller battery capacity or less power remaining. The second communication device may be a communication device having a larger battery capacity or more power remaining.

For example, the first communication device may be a wearable device such as a smart watch, a sports bracelet, etc., or a mobile phone with less power remaining, etc. The second communication device may be a mobile phone with more power, etc.

The first type of network and the second type of network may be networks with different communication protocols, communication bands, and/or power ranges. The first type of network may be a wireless communication network with a smaller coverage area, and the transmission power of the wireless signal in the first type of network is smaller. The second type of network may be a wireless communication network with a larger coverage area, and the transmission power of the wireless signal in the second type of network is higher.

For example, the second type of network may be a cellular mobile communication network such as 4G or 5G. The first type of network may be a short-range communication network such as Blue Tooth (BT), low-power Blue Tooth, or Wi-Fi.

The first communication device and the second communication device may both have the ability to access the first type of network and the second type of network. The first communication device and the second communication device may access the second type of network at the same time, and the first communication device and the second communication device are connected to each other via the first type of network. For example, the smart watch and the mobile phone may access a 4G or 5G cellular mobile communication network, and the smart watch and the mobile phone are connected to each other via low-power Blue Tooth.

The base station etc. of the second type of network may send a measurement configuration to instruct the first communication device to perform a wireless signal measurement. Since the battery power of the first communication device such as a smart watch, a bracelet and other wearable devices is small, frequent wireless signal measurements may consume battery current and reduce standby time. Therefore, the first communication device, after receiving the measurement configuration, may not perform the wireless signal measurement, but may instruct the second communication device to perform the wireless signal measurement by sending a command, etc. Since the first communication device and the second communication device are close to each other, the measurement results obtained from the wireless signal measurements performed by the first communication device and the second communication device are relatively close. The measurement result obtained by the second communication device can be used as a basis for the first communication device to perform operations such as cell reselection. Therefore, after completing the wireless signal measurement, the second communication may send the measurement result, etc., to the first communication device via the first class network. The power consumption of the first type of network between the first communication device and the second communication device is lower than the power consumption of the first communication device to perform the wireless signal measurement for the second type of network. Therefore, the power consumption of the first communication caused by performing the wireless signal measurement the first communication device may be reduced.

For example, the first communication device is a smart watch, the second communication device is a mobile phone, the first type of network is a Blue Tooth network, and the second type of network is a 5G cellular mobile communication network. A base station of the 5G cellular mobile communication network sends a measurement configuration to the smart watch to instruct the smart watch to perform a wireless signal measurement for the 5G cellular mobile communication network. After receiving the measurement configuration, the smart watch may instruct the mobile phone to perform a wireless signal measurement via a Blue Tooth connection, etc. After the mobile phone completes the wireless signal measurement, the mobile phone may send the measurement result, etc. to the smart watch via Blue Tooth, etc. The mobile phone may perform additional wireless signal measurements based on the measurement configuration sent by the smart watch. The mobile phone may also combine the wireless signal measurement instructed by the smart watch with its own wireless signal measurement, so that the power consumption of the mobile phone can be saved.

Due to the close distance between the smart watch and the mobile phone, the measurement results obtained from the wireless signal measurements by the smart watch and the mobile phone are relatively close. The measurement result obtained by the mobile phone can be used as the basis for operations such as cell reselection by the smart watch. In this case, the power consumption of the Blue Tooth connection between the smart watch and the cell phone is lower than the power consumption of the wireless signal measurement performed by the smart watch for the cellular mobile communication network. Therefore, the power consumption of the smart watch caused by performing the wireless signal measurement may be reduced.

In this way, the wireless signal measurement is performed by the second communication device and the measurement result are sent to the first communication device, which reduces the power consumption of the first communication device caused by performing the wireless signal measurement, and thus extends the standby time of the first communication device.

In one embodiment, prior to step 401, the signal measurement method may further include: receiving, via the first type of network, a measurement configuration of the second type of network from the first communication device.

Accordingly, step 401 may include: performing the wireless signal measurement for the second type of network based on the measurement configuration.

The base station of the second type of network may send the measurement configuration to instruct the first communication device to perform a wireless signal measurement. Since the battery power of the first communication device such as a smart watch, a bracelet and other wearable devices is small, frequent wireless signal measurements may consume battery current and reduce standby time. Therefore, instead of performing the wireless signal measurement after receiving the measurement configuration, the first communication device may send the measurement configuration to the second communication device via the first type of network, and then the second communication device performs the wireless signal measurement. Since the first communication device and the second communication device are close to each other, the measurement results obtained from the wireless signal measurements performed by the first communication device and the second communication device are relatively close. The measurement result obtained by the second communication device can be used as a basis for the first communication device to perform operations such as cell reselection. Therefore, after completing the wireless signal measurement, the second communication device may send the measurement result, etc., to the first communication device. The measurement result may be sent by the second communication to the first communication device via the first type of network.

For example, the second communication device is a mobile phone, the first communication device is a smart watch, the second type of network is a 5G cellular mobile communication network, and the first type of network is a Blue Tooth network or Wi-Fi, etc. A base station of the 5G cellular mobile communication network sends a measurement configuration to the smart watch to instruct the smart watch to perform a wireless signal measurement for the 5G cellular mobile communication network. After receiving the measurement configuration, the smart watch may send the measurement configuration to the mobile phone via a Blue Tooth connection, and then the mobile phone performs the wireless signal measurement for the second type of network according to the measurement configuration. After completing the wireless signal measurement, the mobile phone may send the measurement result, etc. to the smart watch. In this case, after the mobile phone receives the measurement configuration from the smart watch, the mobile phone performs the wireless signal measurement and sends the measurement result to the smart watch via a Blue Tooth connection.

In this way, performing the wireless signal measurement by the second communication device can reduce the power consumption of the first communication device and extend the standby time of the first communication device.

In one embodiment, the signal measurement method may further include: sending, in response to the measurement result meeting a cell reselection condition, a reselection instruction to the first communication device via the first type of network.

The reselection instruction instructs the first communication device to perform a cell reselection.

After the second communication device performs the wireless signal measurement to obtain the measurement result, the second communication device may determine whether the first communication device will perform a cell reselection based on the measurement result. The condition for the second communication device to determine whether the first communication device will perform a cell reselection may be the same as the condition for the first communication device itself to determine whether it will performs a cell reselection.

If the second communication device determines that the first communication device needs to perform a cell reselection, the second communication device may send a reselection instruction to the first communication device via the first type of network, which instructs the first communication device to perform the cell reselection. The cell reselection instruction may include information of a reselected cell. The first communication device may perform the cell reselection according to the reselection instruction.

In one embodiment, prior to step 402, the signal measurement method may further include: receiving a measurement indication send by the first communication device via the first type of network.

Accordingly, step 402 may include: sending, via the first type of network, the measurement result obtained by performing the wireless signal measurement to the first communication device according to the measurement indication.

After a connection is established between the first communication device and the second communication via the first type of network, the first communication device may send a measurement indication via the first type of network. The measurement indication may be a configuration configuring the second communication device to receive an indication from the first communication device to perform a wireless signal measurement for the second type of network and send a measurement result to the first communication device via the first type of network.

After the second communication device receives the measurement indication, the second communication device performs the wireless signal measurement according to the first communication device's indication and sends the measurement result to the first communication device after each completed wireless signal measurement.

In one embodiment, step 402 may include: sending, in response to a signal strength of the first type of network being greater than a signal strength threshold, the measurement result obtained by performing the wireless signal measurement to the first communication device via the first type of network.

The signal strength of the first type of network may be the signal strength of the wireless signals received by the first communication device from the second communication device. Although the first communication device and the second communication device are connected via the first type of network, the first communication device and the second communication device may not belong to the same second type of network. Therefore, the distance between the first communication device and the second communication device may be identified by determining the signal strength of the first class network. When the first communication device and the second communication device are relatively close to each other, it can be determined that there is a high probability that the first communication device and the second communication device belong to the same second type of network, and in this case, the wireless signal measurement can be performed by the second communication device for the second type of network.

For example, the smart watch is connected to the mobile phone via low-power Blue Tooth, and the smart watch may detect the signal strength of the Blue Tooth signal sent by the mobile phone. When the signal strength of the Blue Tooth signal is greater than a signal strength threshold, it is considered that the smart watch and the mobile phone are relatively close to each other and there is a high probability that the smart watch and the mobile phone are in the same mobile communication network cell, and the wireless signal measurement can be performed by the mobile phone.

A specific example is described below in conjunction with any of the above embodiments.

This example provides specific steps for a mobile phone to receive the paging signaling of a wearable device A connected to it.

Figure 5A:
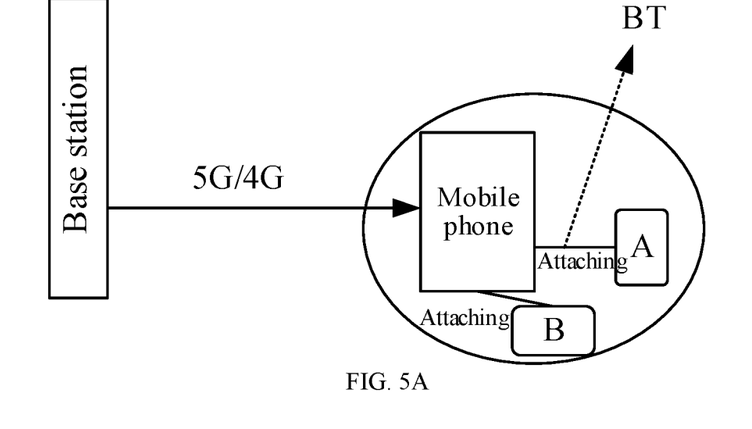
FIG. 5A is a schematic diagram of a communication architecture illustrated according to an embodiment.

As shown in FIG. 5A, the mobile phone is connected to the wearable device A via Blue Tooth, and the mobile phone may further be connected to the wearable device B via Blue Tooth. The mobile phone and the wearable device A may be connected to a base station via 4G or 5G cellular mobile communication technology. The mobile phone may obtain the Subscriber Identity Modula (SIM) information of the wearable device A through authorization, etc. The SIM information may include International Mobile Subscriber Identity (IMSI), etc.

Figure 5B:
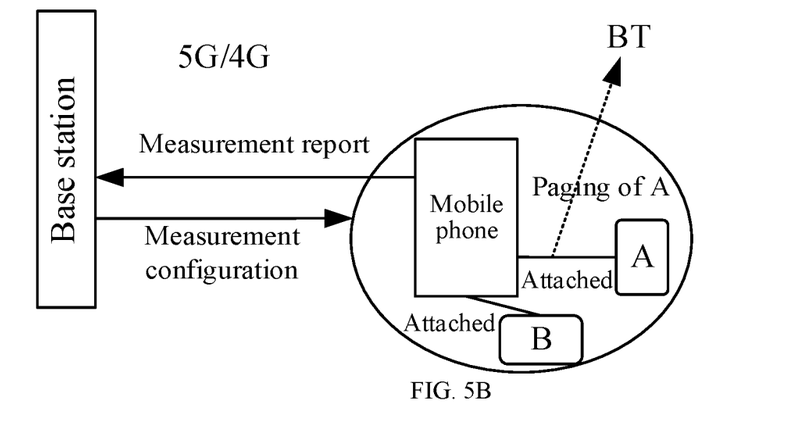
FIG. 5B is a schematic diagram of another communication architecture illustrated according to an embodiment.

As shown in FIG. 5B, after the wearable device A is connected to the mobile phone, an attach procedure can first be performed. The attach procedure may refer to the wearable device A instructing, by means of a command or the like, the mobile phone to perform the signal measurement of the wearable device A.

Figure 5C:
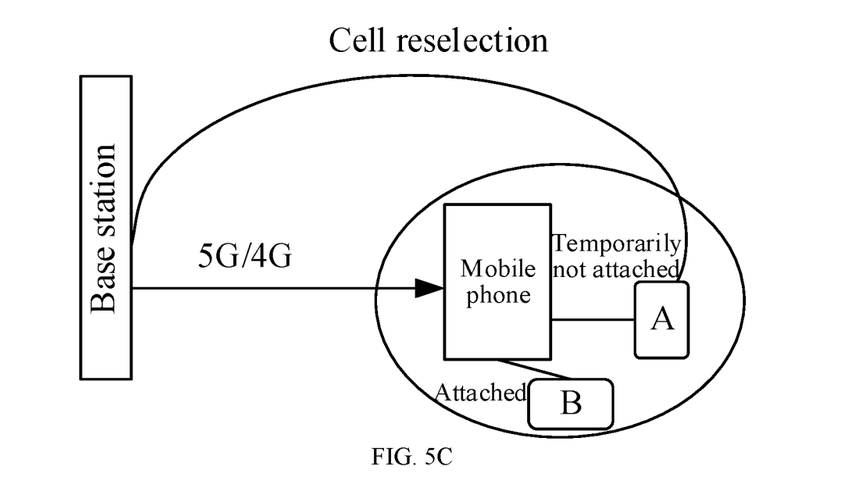
FIG. 5C is a schematic diagram of yet another communication architecture illustrated in accordance with an embodiment.

As shown in FIG. 5C, after the attach procedure between the wearable device A and mobile phone is complete, the wearable device A receives a measurement configuration and sends the measurement configuration to the mobile phone, so that the mobile phone performs the wireless signal measurement and sends the measurement result to the wearable device A. The wearable device A performs a cell reselection, etc. based on the measurement result.

Figure 6:
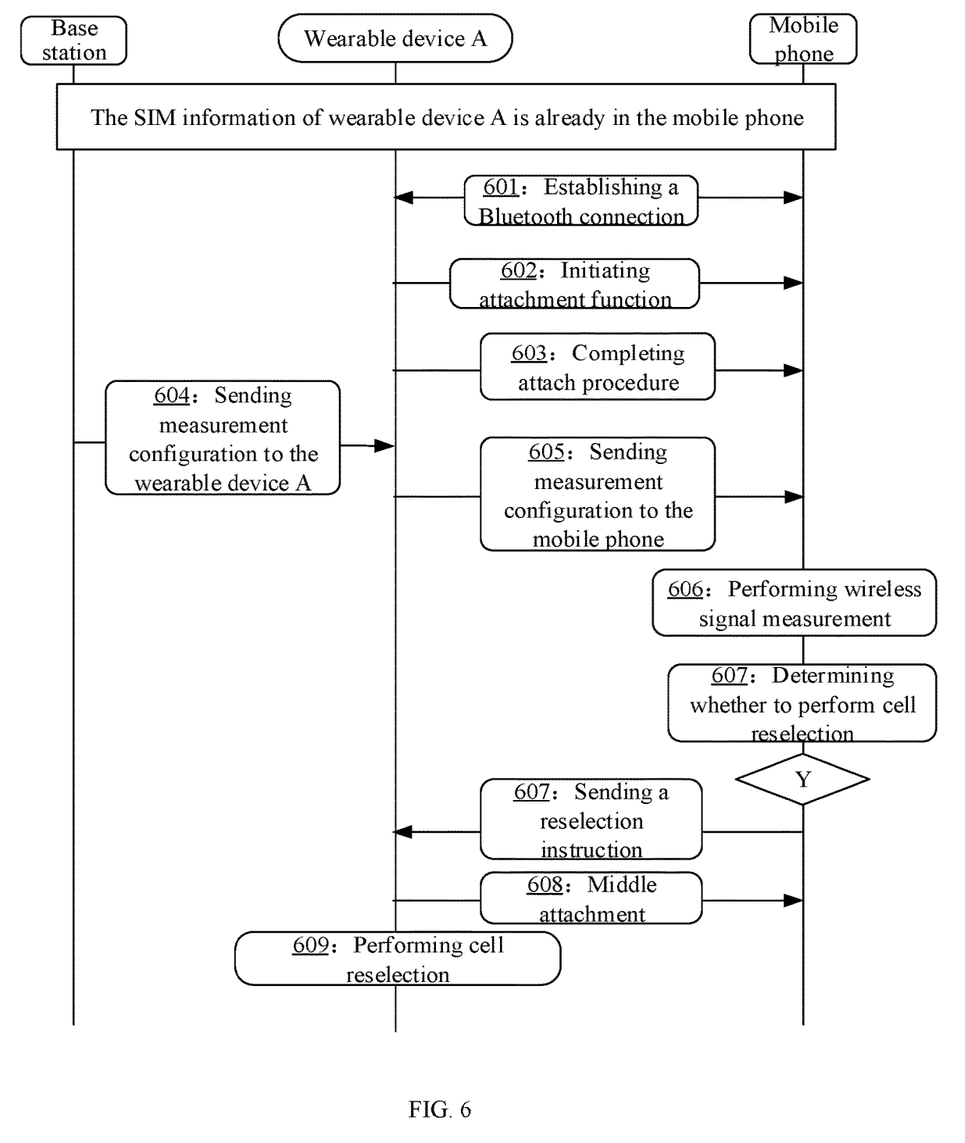
FIG. 6 is a schematic diagram of an information interaction illustrated in accordance with an embodiment.

The information interaction between the base station, mobile phone and wearable device A is shown in FIG. 6, including the following steps.

Step 601, the mobile phone and the wearable device A establish a Blue Tooth connection.

Step 602, an attach procedure is performed between the mobile phone and the wearable device A, indicating that a wireless signal measurement is to be performed by the mobile phone.

Step 603, the attach procedure is completed, and the mobile phone will perform the wireless signal measurement.

Step 604, the base station sends a measurement configuration for the wearable device A.

Step 605, the wearable device A sends the measurement configuration to the mobile phone.

Step 606, the mobile phone performs the wireless signal measurement.

Step 607, the mobile phone, in response to the measurement result indicating that a cell reselection is required, sends a reselection instruction to the wearable device A, the reselection instruction indicating a target cell for reselection.

Step 608, the wearable device A continues to attach to the mobile phone after the data communication ends.

Step 609, the wearable device A performs a cell reselection according to the reselection instruction.

Figure 7:
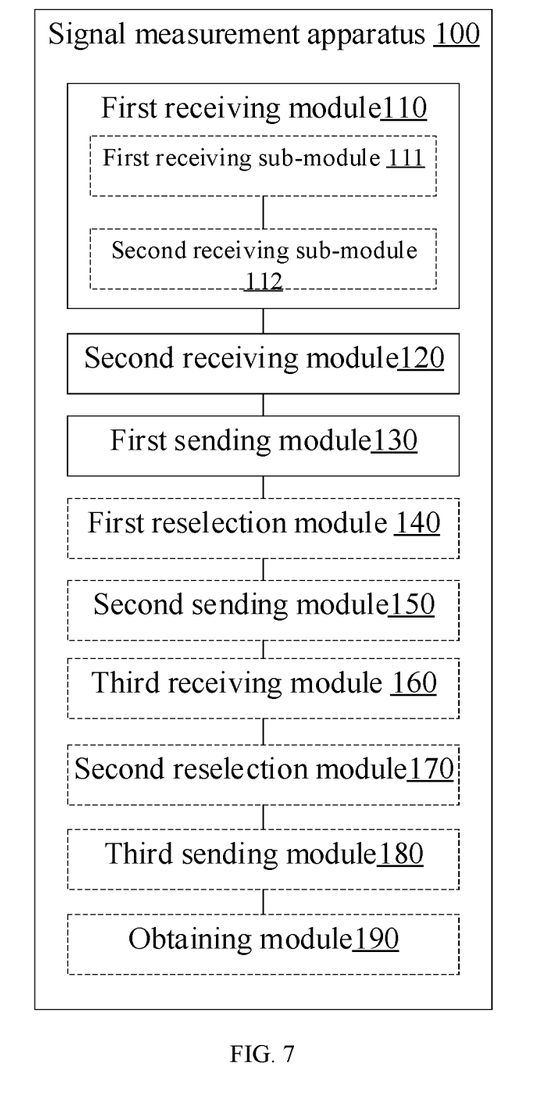
FIG. 7 is a block diagram of a signal measurement apparatus illustrated in accordance with an embodiment.

There is provided a signal measurement apparatus according to the embodiments of this application, applied to a first communication device. FIG. 7 is a schematic diagram of the composition structure of the signal measurement apparatus 100 provided by embodiments of this application. As shown in FIG. 7, the apparatus 100 includes a first receiving module 110.

The first receiving module 110 is configured to receive, via a first type of network, a measurement result for a second type of network from a second communication device.

In one embodiment, the apparatus 100 further includes a second receiving module 120 configured to receive, via the second type of network, a measurement configuration of the second type of network from a base station of the second type of network before receiving, via the first type of network, the measurement result for the second type of network from the second communication device; and a first sending module 130 configured to send, via the first type of network, the measurement configuration to the second communication device. The first receiving module 110 includes a first receiving sub-module 111 configured to receive, via the first type of network, the measurement result that is obtained by a wireless signal measurement performed by the second communication device for the second type of network based on the measurement configuration.

In one embodiment, the apparatus 100 further includes a first reselection module 140 configured to perform, in response to the measurement result meeting a cell reselection condition, a cell reselection.

In one embodiment, the apparatus 100 further includes a second sending module 150 configured to send a measurement report comprising the measurement result to the base station of the second type of network.

In one embodiment, the apparatus 100 further includes a third receiving module 160 configured to receive, via the first type of network, a reselection instruction from the second communication device; and a second reselection module 170 configured to perform a cell reselection according to the reselection instruction. The reselection instruction is determined by the second communication device based on the measurement result.

In one embodiment, the apparatus 100 further includes a third sending module 180 configured to send, via the first type of network, a measurement indication to the second communication device, where the measurement indication instructs the second communication device to send the measurement result for the second type of network to the first communication device via the first type of network.

In one embodiment, the apparatus 100 further includes an obtaining module 190 configured to obtain a measurement result of a wireless signal measurement performed by the first communication device for the second type of network.

In one embodiment, the first receiving module includes a second receiving sub-module 112 configured to receive, in response to a signal strength of the first type of network being greater than a signal strength threshold, the measurement result for the second type of network via the first type of network from the second communication device.

Figure 8:
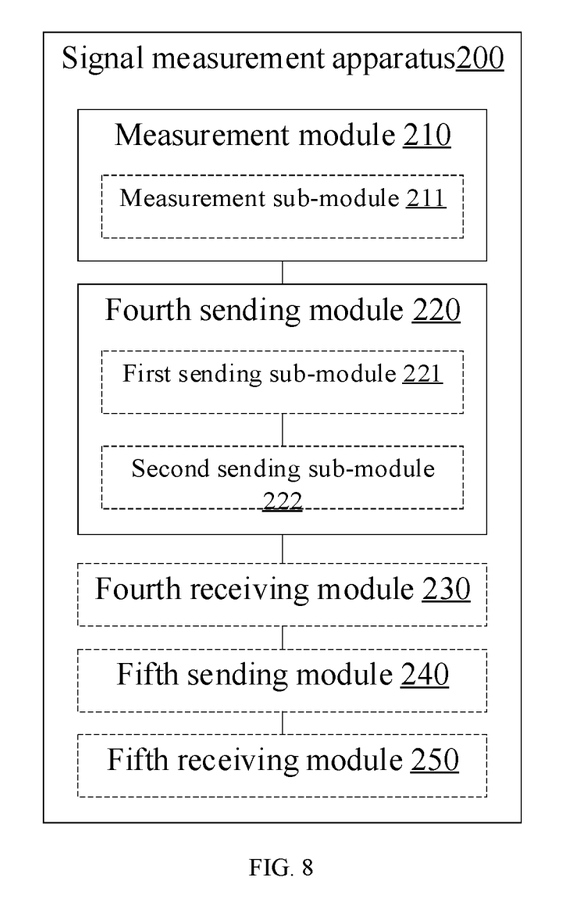
FIG. 8 is a block diagram of a signal measurement apparatus illustrated in accordance with an embodiment.

There is provided a signal measurement apparatus according to the embodiments of this application, applied to a second communication device. FIG. 8 is a schematic diagram of the composition structure of the signal measurement apparatus 200 provided by embodiments of this application. As shown in FIG. 8, the apparatus 200 includes a measurement module 210 and a fourth sending module 220.

The measurement module 210 is configured to perform a wireless signal measurement for a second type of network; and the fourth sending module 220 is configured to send, via a first type of network, a measurement result obtained by performing the wireless signal measurement to a first communication device.

In one embodiment, the apparatus 200 further includes a fourth receiving module 230 configured to receive, via the first type of network, a measurement configuration of the second type of network from the first communication device before performing a wireless signal measurement for a second type of network. The measurement module 210 includes a measurement sub-module 211 configured to perform the wireless signal measurement for the second type of network based on the measurement configuration.

In one embodiment, the apparatus 200 further includes a fifth sending module 240 configured to send, in response to the measurement result meeting a cell reselection condition, a reselection instruction to the first communication device via the first type of network, where the reselection instruction instructs the first communication device to perform a cell reselection.

In one embodiment, the apparatus 200 further includes a fifth receiving module 250 configured to receive a measurement indication send by the first communication device via the first type of network before sending, via the first type of network, the measurement result obtained by performing the wireless signal measurement to the first communication device. The fourth sending module 220 includes a first sending sub-module 221 configured to send, via the first type of network, the measurement result obtained by performing the wireless signal measurement to the first communication device according to the measurement indication.

In one embodiment, the fourth sending module 220 includes a second sending sub-module 222 configured to send, in response to a signal strength of the first type of network being greater than a signal strength threshold, the measurement result obtained by performing the wireless signal measurement to the first communication device via the first type of network.

In exemplary embodiments, the first receiving module 110, the second receiving module 120, the first sending module 130, the first reselection module 140, the second sending module 150, the third receiving module 160, the second reselection module 170, the third sending module 180, the obtaining module 190, the measurement module 210, the fourth sending module 220, the fourth receiving module 230, the fifth sending module 240, and the fifth receiving module 250, etc. may be integrated by one or more Central Processing Units (CPUs), Graphics Processing Units (GPUs), baseband processors (BPs), Application Specific Integrated Circuits (ASICs), DSP, Programmable Logic Device (PLD), Complex Programmable Logic Device (CPLD), Field-Programmable Gate Array (FPGA), general-purpose processor, controller, Micro Controller Unit (MCU), Microprocessor, or other electronic components, or may be integrated in combination with one or more radio frequency (RF) antennas, to implement the above-mentioned methods.

Figure 9:
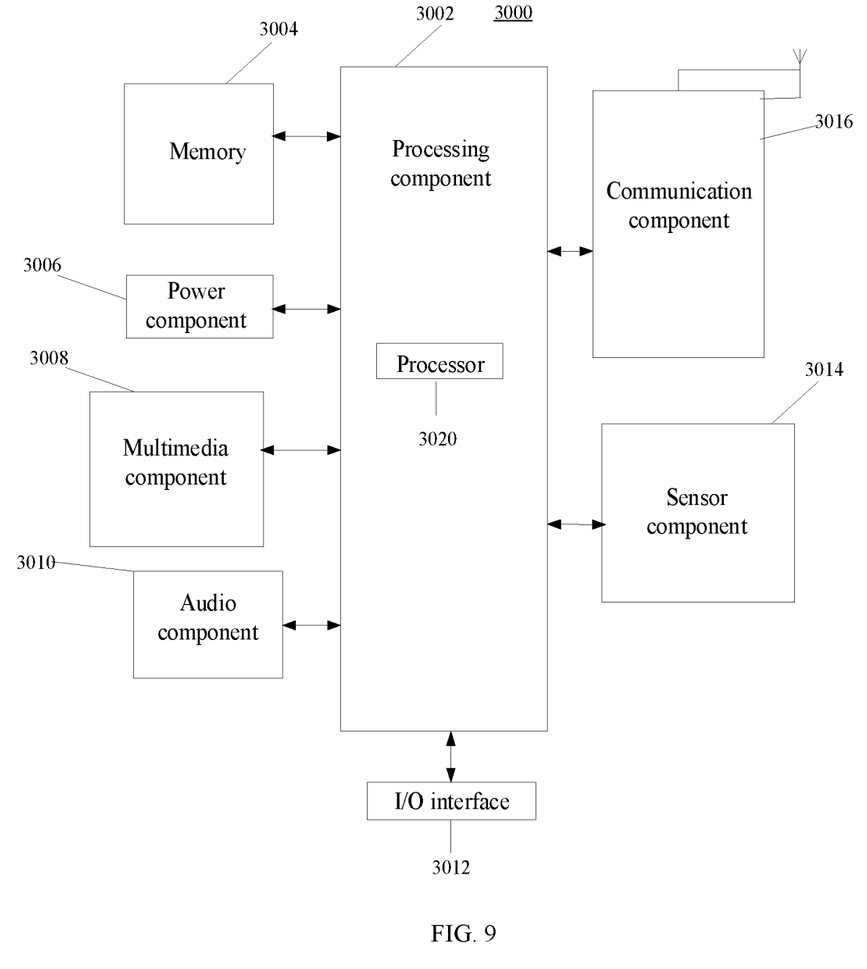
FIG. 9 is a block diagram of a device for signal measurement illustrated according to an embodiment.

FIG. 9 is a block diagram of a device 3000 for signal measurement illustrated according to an exemplary embodiment. For example, the device 3000 may be a mobile phone, a computer, a digital broadcasting terminal, a message receiving and sending device, a game console, a tablet device, a medical device, a fitness device, a personal digital assistant, etc.

Referring to FIG. 9, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls the overall operation of the device 3000, such as operations associated with display, phone call, data communication, camera operation, and recording operations. The processing component 3002 may include one or more processors 3020 to execute instructions to complete all or some of the steps of the method described above. In addition, the processing component 3002 may include one or more modules that facilitate interaction between processing component 3002 and other components. For example, processing component 3002 may include a multimedia module to facilitate interaction between multimedia component 3008 and processing component 3002.

The memory 3004 is configured to store various types of data to support operation at the electronic device 3000. Examples of such data include instructions for any application or method of operation on the device 3000, contact data, phonebook data, messages, images, videos, etc. The memory 3004 can be implemented by any type of transitory or non-transitory storage device or a combination of them, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD.

The power component 3006 provides power to the various components of the device 3000. The power component 3006 may include a power management system, one or more power supplies, and other components associated with generating, managing, and distributing power for the device 3000.

The multimedia component 3008 includes a screen providing an output interface between the device 3000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 3008 includes a front-facing camera and/or a rear-facing camera. The front camera and/or rear camera can receive external multimedia data when the device 3000 is in an operating mode, such as shooting mode or video mode. Each front camera and rear camera may be a fixed optical lens system or have focal length and optical zoom capability.

The audio component 3010 is configured to output and/or input audio signals. For example, the audio component 3010 includes a microphone (MIC) configured to receive external audio signals when the device 3000 is in an operating mode, such as call mode, recording mode, and voice recognition mode. The received audio signal may be further stored in memory 3004 or sent via communication component 3016. In some embodiments, the audio component 3010 further includes a speaker for outputting audio signals.

The I/O interface 3012 provides an interface between the processing component 3002 and a peripheral interface module. The peripheral interface module may be a keyboard, click wheel, button, etc. These buttons may include, but are not limited to, a home button, a volume button, a start button, and a lock button.

The sensor component 3014 includes one or more sensors for providing status assessment of various aspects of the device 3000. For example, the sensor component 3014 may detect an open/closed state of the device 3000, the relative positioning of components, such as the components being the display and keypad of the device 3000, the sensor component 3014 may also detect a change in position of the device 3000 or a component of the device 3000, the presence or absence of user contact with the device 3000, the orientation or acceleration/deceleration of the device 3000 and temperature changes of the device 3000. The sensor component 3014 may include a proximity sensor configured to detect the presence of a nearby object in the absence of any physical contact. The sensor component 3014 may also include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication between the device 3000 and other devices by wired or wireless means. The device 3000 may access a wireless network based on a communication standard, such as WiFi, 2G, 3G, 4G, 5G, or a combination thereof. In one embodiment, communication component 3016 receives broadcast signals or broadcast-related information from an external broadcast management system via a broadcast channel. In an embodiment, the communication component 3016 further includes a near-field communication (NFC) module to facilitate short-range communication. For example, the NFC module may be implemented based on radio frequency identification (RFID) technology, infra-red data association (IrDA) technology, ultra-wideband (UWB) technology, Blue Tooth (BT) technology, and other technologies.

In some embodiments, the device 3000 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing above-mentioned method.

In some embodiments, there is also provided a non-transitory computer readable storage medium including instructions, such as the memory 3004 including instructions, the instructions being executable by the processor 3020 of the device 3000 to accomplish the method described above. For example, the non-transitory computer readable storage medium may be ROM, random access memory (RAM), CD-ROM, magnetic tape, floppy disk, and optical data storage devices, among others.

In the embodiments of the present disclosure, the first communication device receives the measurement result for the second type of network from the second communication device via the first type of network, so that the wireless signal measurement is performed by the second communication device and the measurement result is sent to the first communication device, reducing the power consumption of the first communication device due to the wireless signal measurement, thereby extending the standby time of the first communication device.

Other embodiments of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, and the true scope and spirit of the disclosure being indicated by the following claims.

It should be understood that the present disclosure is not limited to the precise structures described above and illustrated in the accompanying drawings, and that various modifications and changes may be made without departing from the scope thereof. The scope of the present disclosure is limited only by the scope of the appended claims.

What is claimed is:

1. A signal measurement method, comprising:
   receiving, by a first communication device, via a first type of network, a measurement result for a second type of network from a second communication device;
   receiving, by the first communication device, via the first type of network, a reselection instruction from the second communication device, wherein the reselection instruction is determined by the second communication device based on the measurement result; and
   performing, by the first communication device, a cell reselection according to the reselection instruction.

2. The method of claim 1, further comprising:
   receiving, by the first communication device, via the second type of network, a measurement configuration of the second type of network from a base station of the second type of network;
   sending, by the first communication device, via the first type of network, the measurement configuration to the second communication device; and
   receiving, by the first communication device, via the first type of network, the measurement result obtained by a wireless signal measurement performed by the second communication device for the second type of network based on the measurement configuration.

3. The method of claim 1, further comprising:
   sending, by the first communication device, a measurement report comprising the measurement result to the base station of the second type of network.

4. The method of claim 1, further comprising:
   sending, by the first communication device, via the first type of network, a measurement indication to the second communication device, wherein the measurement indication instructs the second communication device to send the measurement result for the second type of network to the first communication device via the first type of network.

5. The method of claim 1, further comprising:
obtaining, by the first communication device, a measurement result of a wireless signal measurement performed by the first communication device for the second type of network.

6. The method of claim 1, further comprising:
receiving, by the first communication device, the measurement result for the second type of network via the first type of network from the second communication device;
wherein a signal strength of the first type of network is greater than a signal strength threshold.

7. A signal measurement method, comprising:
performing, by a second communication device, a wireless signal measurement for a second type of network;
sending, by the second communication device, via a first type of network, a measurement result obtained by performing the wireless signal measurement to a first communication device; and
sending, by the second communication device, a reselection instruction to the first communication device via the first type of network;
wherein the measurement result meets a cell reselection condition, the reselection instruction instructs the first communication device to perform a cell reselection.

8. The method of claim 7, further comprising:
receiving, by the second communication device, via the first type of network, a measurement configuration of the second type of network from the first communication device; and
performing, by the second communication device, the wireless signal measurement for the second type of network based on the measurement configuration.

9. The method of claim 7, further comprising:
receiving, by the second communication device, a measurement indication sent by the first communication device via the first type of network; and
sending, by the second communication device, via the first type of network, the measurement result obtained by performing the wireless signal measurement to the first communication device according to the measurement indication.

10. The method of claim 7, further comprising:
sending, by the second communication device, the measurement result obtained by performing the wireless signal measurement to the first communication device via the first type of network;
wherein a signal strength of the first type of network is greater than a signal strength threshold.

11. A communication device, comprising a processor, a transceiver, a memory and an executable program stored in the memory that is able to be run by the processor, wherein the processor, when running the executable program, performs acts comprising:
receiving via a first type of network, a measurement result for a second type of network from a second communication device;
receiving, via the first type of network, a reselection instruction from the second communication device, wherein the reselection instruction is determined by the second communication device based on the measurement result; and
performing a cell reselection according to the reselection instruction.

12. The communication device of claim 11, wherein the processor is further configured to performs acts comprising:
receiving, via the second type of network, a measurement configuration of the second type of network from a base station of the second type of network;
sending, via the first type of network, the measurement configuration to the second communication device; and
receiving, via the first type of network, the measurement result obtained by a wireless signal measurement performed by the second communication device for the second type of network based on the measurement configuration.

13. The communication device of claim 11, wherein the processor is further configured to performs acts comprising:
sending, via the first type of network, a measurement indication to the second communication device, wherein the measurement indication instructs the second communication device to send the measurement result for the second type of network to the communication device via the first type of network.

14. The communication device of claim 11, wherein the processor is further configured to performs acts comprising:
receiving the measurement result for the second type of network via the first type of network from the second communication device;
wherein a signal strength of the first type of network is greater than a signal strength threshold.

* * * * *